United States Patent Office 3,573,279
Patented Mar. 30, 1971

3,573,279
1-SUBSTITUTED CYCLOALKYL PENICILLINS
Harvey E. Alburn, West Chester, and William Dvonch, Radnor, Pa., assignors to American Home Products Corporation, New York, N.Y.
No Drawing. Filed Jan. 25, 1967, Ser. No. 611,555
Int. Cl. C07d 99/16
U.S. Cl. 260—239.1                                  17 Claims

ABSTRACT OF THE DISCLOSURE

The compounds are certain 1-substituted cycloalkyl penicillins having antibiotic activity, and also intermediates which are useful for preparing mixed anhydride compounds suitable for reacting with 6-aminopenicillanic acid for producing said penicillins.

BACKGROUND OF THE INVENTION

This invention relates generally to the production of synthetic penicillins and, more particularly, to novel 1-substituted cycloalkyl penicillin compounds, prepared with the use of certain novel mixed anhydrides of 1-substituted cycloalkyl carboxylic acids as reactants, which, in turn, are prepared from novel corresponding 1-substituted cycloalkyl carboxylic acids as intermediates or starting materials, all as defined hereinafter, and to methods for the preparation respectively of said starting materials, reactants, and penicillins.

Certain 6-(1-substituted cycloalkylcarboxamido)penicillanic acids, per se, i.e., a specified group of compounds wherein the 1-substituent is an amino group, are already known to the art from U.S. Pat. 3,194,802, which discloses a simple and economic method for the production of said compounds. In accordance with said method, the now known compounds may generally be prepared by reacting a suitable 4-substituted-2,5-oxazolidinedione, (also known as an N-carboxyamino acid anhydride) with 6-aminopenicillanic acid (6–APA), or a salt thereof, under specified reaction conditions. As disclosed in said patent the reaction is preferably caused to occur in a cold aqueous solution, which is stirred for several hours at a temperature within the range of just above the freezing point of the aqueous mixture, to about 37° C., and most preferably, in the range of 0°–10° C.

The 6 - (1 - aminocycloalkylcarboxamido)penicillanic acids diclosed in said patent are of recognized value for their broad spectrum antibacterial activity, and are useful as therapeutical agents in the treatment of infectious diseases caused by gram-positive and gram-negative bacteria, upon parenteral or oral administration.

DESCRIPTION OF THE INVENTION

We have now discovered a new series of 6-(1-substituted-cycloalkylcarboxamido)penicillanic acids also having value because of their broad spectrum antibacterial activity.

The novel compounds of the present invention, when considered in their broadest aspects, include those compounds encompassed within the following structural formula:

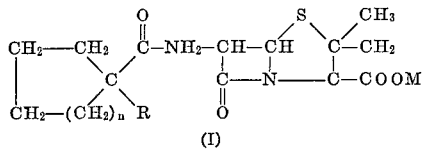

wherein
$n$ is an integer from 0 to 3;
R is selected from the group consisting of hydroxy, lower alkanoyloxy and ureido; and
M is selected from the group consisting of hydrogen and non-toxic metal ions.

Generally, the novel penicillanic acid compounds of the invention may be prepared by admixing a selected one of the mixed anhydrides of a 6-(1-substituted cycloalkylcarboxylic) acid (II) described hereinafter, with 6-aminopenicillanic acid. The aforesaid general reaction involved in the preparation of the penicillanic acid compounds may be shown schematically as follows:

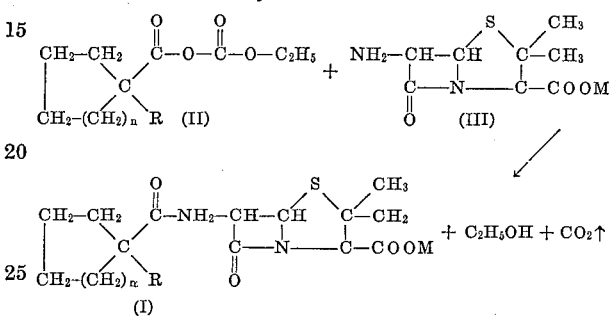

wherein $n$, R and M have the same meaning as described for Formula (I) hereinbefore. In this manner there may be prepared such novel compounds having antibiotic activity as 6-(1-hydroxycyclopentanecarboxamido)penicillanic acid, 6-(1-acetoxycyclohexanecarboxamido)penicillanic acid, 6-(1-ureidocycloheptanecarboxamido)penicillanic acid, etc., and the pharmaceutically acceptable salts thereof.

The novel mixed anhydride intermediates (II) above may by prepared from their corresponding carboxylic acids (IV) by the method which comprises generally reacting the selected acid (IV) with ethyl chloroformate (V) in the presence of triethylamine (VI). The aforesaid general reaction involved in the preparation of the novel mixed anhydride intermediates (II) may be shown schematically as follows:

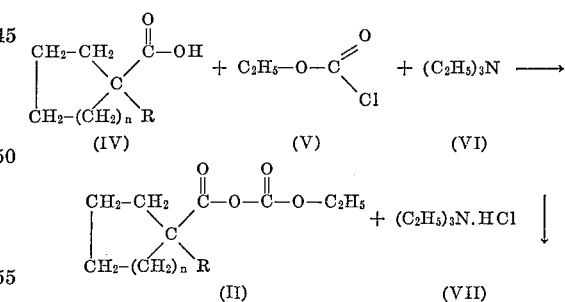

wherein $n$, R and M have the same meaning as described for Formula (I) hereinbefore.

Several of the starting compounds which may be employed in the preparatory procedure referred to above are known compounds which are readily available from commercial sources. Others which are not commercially available can easily be prepared in accordance with standard organic procedures well known to those skilled in the art, or by procedures described herein.

The following examples are illustrative of the invention, but are not to be considered as necessarily limitative thereof.

EXAMPLE I

1-hydroxycyclopentanecarboxylic acid, acetate

Mixing of 1-hydroxycyclopentanecarboxylic acid (Aldrich 10,148–6) with acetyl chloride in a ratio of 1.00 g./1.52 ml. led to a spontaneous reaction to form the acetate [cf. Org. Syntheses Coll. vol. 1, 12 (1941)]. The slurry produced was concentrated in vacuo and dried over silica-gel and sodium hydroxide to give a 98% crude yield of the acetate. Crystallization from a small amount of hot water gave an 83% yield (81% overall) of the pure product; M.P. 116–119°.

Analysis.—Calcd. for $C_8H_{12}O_4$ (percent): C, 55.80; H, 7.02. Found (percent): C, 55.57; H, 6.73.

EXAMPLE II

1-hydroxycycloheptanecarboxylic acid, acetate

Following the procedure of Example I, but using as the selected carboxylic acid, 1-hydroxycycloheptanecarboxylic acid, the titled compound was similarly prepared and recrystallized from benzene to give an overall yield of 39%; M.P. 85–90°.

Analysis.—Calcd. for $C_{10}H_{16}O_4$ (percent): C, 60.00; H, 8.04. Found (percent): C, 59.91; H, 8.03.

EXAMPLE III

1-ureidocyclohexanecarboxylic acid 1-aminocyclohexanecarboxylic acid (14.3 g., 0.10 mole) was added to water (100 ml.) containing potassium cyanate (10 g., 0.12 mole). The solution was concentrated on a steam-bath in an air stream to a syrup. The syrup was taken up in water (400 ml.), and the pH was adjusted from 9.6 to 2.0 with concentrated hydrochloric acid. The precipitate was collected and washed with cold water, 11.2 g. (60% yield); M.P. 180–2°. Recrystallization from hot water (10 g./350 ml.) gave a 46% recovery of the titled product (25% overall yield), M.P. 180–2°.

Analysis.—Calcd. for $C_8H_{14}N_2O_3$ (percent): C, 51.60; H, 7.58; N, 15.06. Found (percent): C, 50.98; H, 7.57; N, 14.61.

EXAMPLE IV

Sodium 6-(1-acetoxycyclopentanecarboxamido) penicillanate (A) Ethyl chloroformate (0.96 ml.; 0.010 mole) was added to an ice-cold solution of the acetate of 1-hydroxycyclopentanecarboxylic acid (1.72 g.; 0.010 mole) obtained as in Example I and triethylamine (1.66 ml.; 0.012 mole) in acetone (84 ml.). The solution was stirred at 0° for 5 min., during which triethylamine hydrochloride precipitated.

(B) The suspension was cooled to −50° (Dry Ice-acetone bath) and stirred vigorously (mechanical stirring) during the rapid addition of an ice-cold solution of 6-APA (2.60 g.; 0.012 mole) in 3% sodium bicarbonate (84 ml., 0.030 mole), temperature kept below 0°. The resulting solution was stirred 30 min. at 0° and 30 min. at 25° and was finally extracted with ether (3× 80 ml.), only the aqueous phase being kept.

(C) The aqueous phase was adjusted from pH 10.85 to pH 2.0 by the addition of hydrochloric acid and extracted with methyl isobutyl ketone (3× 30 ml.). The penicillin was reconverted to the sodium salt by extracting the methyl isobutyl ketone with sufficient 3% sodium bicarbonate solution to give a neutral aqueous phase which was separated and freeze-dried to give 4.4 g. crude salt (102% as the dihydrate).

Analysis.—Calcd. for $C_{16}H_{21}N_2O_6NaS \cdot 2H_2O$ (percent): C, 44.8; H, 5.9; N, 6.5. Found (percent): C, 44.2; H, 5.5; N, 6.3.

Hydroxamate assay: 85% of 6–APA on mole basis.

EXAMPLE V

1-ureidocyclopentanecarboxylic acid

Following the procedure of Example III, but substituting 0.10 mole of 1-aminocyclopentanecarboxylic acid as the acid for reaction with potassium cyanate, 1-ureidocyclopentanecarboxylic acid is prepared.

EXAMPLE VI

Mixed anhydrides of cycloalkylcarboxylic acids and 1-substituted cycloalkyl penicillins prepared therefrom Following the general procedure of Example IV, ethyl chloroformate was reacted with a molal equivalent of a series of 1-substituted cycloalkylcarboxylic acids as starting materials to obtain the corresponding mixed anhydrides (in accordance with part A of said example), which mixed anhydrides, in turn, were respectively reacted with charges of 6-aminopenicillanic acid in the presence of sodium bicarbonate (in accordance with the procedure of part B of said example), and the resulting products were further treated (as described in part C of the example) to obtain a series of new penicillins, as given in Table A below:

TABLE A

| 1-substituted cycloalkylcarboxylic acids | 1-substituted cycloalkyl penicillins (as Na salts) |
|---|---|
| 1-acetoxycyclopentanecarboxylic acid. | 6-(1-acetoxycyclopentanecarboxamido) penicillanic acid. |
| 1-acetoxycycloheptanecarboxylic acid. | 6-(1-acetoxycycloheptanecarboxamido) penicillanic acid. |
| 1-hydroxycyclopentanecarboxylic acid. | 6-(1-hydroxycyclopentanecarboxamido) penicillanic acid. |
| 1-ureidocyclohexanecarboxylic acid. | 6-(1-ureidocyclohexanecarboxamido) penicillanic acid. |
| 1-hydroxycycloheptanecarboxylic acid. | 6-(1-hhdroxycycloheptanecarboxamido) penicillanic acid. |
| 1-acetoxycyclohexanecarboxylic acid. | 6-(1-acetoxycyclohexanecarboxamido) penicillanic acid. |
| 1-hydroxycyclohexanecarboxylic acid. | 6-(1-hydroxycyclohexanecarboxamido) penicillanic acid. |

EXAMPLE VII

Again following the procedures of Examples IVA, B, and C, the penicillins are ultimately obtained with the use of the corresponding starting materials, as given in Table B below:

TABLE B

| 1-substituted cycloalkylcarboxylic acids | 1-substituted cycloalkyl penicillins |
|---|---|
| 1-propanoyloxypentanecarboxylic acid. | 6-(1-propanoyloxypentanecarboxamido) penicillanic acid. |
| 1-pentanoyloxyhexanecarboxylic acid. | 6-(1-pentanoyloxyhexanecarboxamido) pencillanic acid. |
| 1-butanoyloxyheptanecarboxylic acid. | 6-(1-butanoyloxyheptanecarboxamido) penicillanic acid. |
| 1-acetoxybutanecarboxylic acid. | 6-(1-acetoxycyclobutanecarboxamido) penicillanic acid. |

What is claimed is:

1. A compound of the group consisting of those having the following formula:

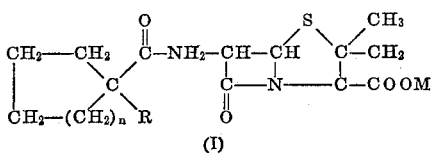

(I)

wherein
 $n$ is an integer from 0 to 3;
 R is selected from the group consisting of hydroxy, lower alkanoyloxy and ureido; and
 M is selected from the group consisting of hydrogen and non-toxic metal ions.

2. A compound as defined in claim 1, which is: 6-(1-acetoxycyclopentanecarboxamido)penicillanic acid.

3. A compound as defined in claim 1, which is: the sodium salt of 6-(1-acetoxycyclopentanecarboxamido)-penicillanic acid.

4. A compound as defined in claim 1, which is: 6-(1-acetoxycycloheptanecarboxamido)penicillanic acid.

5. A compound as defined in claim 1, which is: the sodium salt of 6-(1-acetoxycycloheptanecarboxamido)penicillanic acid.

6. A compound as defined in claim 1, which is: 6-(1-hydroxycyclopentanecarboxamido)penicillanic acid.

7. A compound as defined in claim 1, which is: the sodium salt of 6-(1-hydroxycyclopentanecarboxamido)penicillanic acid.

8. A compound as defined in claim 1, which is: 6-(1-ureidocyclohexanecarboxamido)penicillanic acid.

9. A compound as defined in claim 1, which is: the sodium salt of 6-(1-ureidocyclohexanecarboxamido)penicillanic acid.

10. A compound as defined in claim 1, which is: 6-(1-ureidocyclopentanecarboxamido)penicillanic acid.

11. A compound as defined in claim 1, which is: the sodium salt of 6-(1-ureidocyclopentanecarboxamido)penicillanic acid.

12. A compound as defined in claim 1, which is: 6-(1-hydroxycycloheptanecarboxamido)penicillanic acid.

13. A compound as defined in claim 1, which is: the sodium salt of 6-(1-hydroxycycloheptanecarboxamido)penicillanic acid.

14. A compound as defined in claim 1, which is: 6-(1-acetoxycyclohexanecarboxamido)penicillanic acid.

15. A compound as defined in claim 1, which is: the sodium salt of 6-(1-acetoxycyclohexanecarboxamido)penicillanic acid.

16. A compound as defined in claim 1, which is: 6-(1-hydroxycyclohexanecarboxamido)penicillanic acid.

17. A compound as defined in claim 1, which is: the sodium salt of 6-(1-hydroxycyclohexanecarboxamido)penicillanic acid.

References Cited
UNITED STATES PATENTS 3,194,802   7/1965   Alburn et al. _____ 260—239.1

NICHOLAS S. RIZZO, Primary Examiner

U.S. Cl. X.R.

424—271